(12) United States Patent
Falk

(10) Patent No.: US 7,780,300 B2
(45) Date of Patent: Aug. 24, 2010

(54) VARIABLE FOCUS DEFORMABLE SURFACE USING ROTATION MEANS FOR ROTATING THE UPPER AND LOWER MATERIAL LAYERS ABOUT A CENTER AXIS

(76) Inventor: R. Aaron Falk, 600 Naches Ave. SW., Suite B110, Renton, WA (US) 98055

( * ) Notice: Subject to any disclaimer, the term of this patent is extended or adjusted under 35 U.S.C. 154(b) by 35 days.

(21) Appl. No.: 11/757,149

(22) Filed: Jun. 1, 2007

(65) Prior Publication Data

US 2007/0281377 A1 Dec. 6, 2007

Related U.S. Application Data

(60) Provisional application No. 60/803,701, filed on Jun. 1, 2006.

(51) Int. Cl.
*G02B 5/08* (2006.01)
(52) U.S. Cl. .................................................... 359/849
(58) Field of Classification Search ......... 359/290–291, 359/846–849; 248/476–487
See application file for complete search history.

(56) References Cited

U.S. PATENT DOCUMENTS

| 6,193,381 B1 * | 2/2001 | Holler | 359/849 |
| 6,844,960 B2 * | 1/2005 | Kowarz | 359/298 |

* cited by examiner

*Primary Examiner*—Alessandro Amari
*Assistant Examiner*—Jennifer L. Doak
(74) *Attorney, Agent, or Firm*—Black Lowe & Graham PLLC

(57) ABSTRACT

A large, thin, variable focus lens that would be practical in a variety of applications, such as eyeglasses. An example of the present invention is a surface that can be deformed to a desirable shape in a simple, controllable fashion. In particular, a surface shape with desirable optical properties is achievable. The surface has the ability to produce a reflective or refractive surface with a variable optical power.

11 Claims, 4 Drawing Sheets

Top View

Cross Section

VARIABLE FOCUS DEFORMABLE SURFACE USING ROTATION MEANS FOR ROTATING THE UPPER AND LOWER MATERIAL LAYERS ABOUT A CENTER AXIS

PRIORITY CLAIM

This application claims the benefit of U.S. Provisional Application Ser. No. 60/803,701 filed Jun. 1, 2006, which is hereby incorporated by reference.

BACKGROUND OF THE INVENTION

An imaging system generally needs the capability to adjust the focus to compensate for varying object distances. There are number of available techniques for performing this function. These techniques will primarily be described in terms of refractive imaging systems using lenses; however, equivalent reflective elements can often be substituted.

A first, and probably the most common, technique is to simply mechanically move the lens elements along the optical axis. The focus adjustments on a camera, microscope, or telescope are typical examples. There are numerous variations on mechanical focusing. The primary drawback of this technique is bulk. Large variation in lens position is required in order to accommodate large variations in object distance.

A second technique uses segmented optics with individual actuators on the segments. This approach is primarily seen in reflective optical systems such as large telescope mirrors. Segmented optical systems are primarily used in adaptive optics systems to compensate for variable distortions caused by effects such as atmospheric turbulence. Some limited focusing can be achieved with this technique. Clearly, the mechanical and control aspects of a segmented optic is very complex.

A third technique uses a liquid filled, elastic lens in which mechanical pressure is used to deform the curvature of the lens. This technique is exemplified by U.S. Pat. No. 7,142,369. Basically, the technique seeks to mimic the focus mechanism used in the eye. The main difficulties with this approach are that the lens quality is highly dependent on the elastic uniformity of the lens material and that the curvature achieved is not optimal for imaging. As with the eye, image quality is only good for objects near the center of the field of vision and non-uniform imaging, e.g. astigmatism, can occur. For larger lenses, gravity or acceleration can significantly affect the imaging quality by causing the lens to sag.

A fourth technique also uses a liquid lens approach. In this technique, two, non-mixing liquids are used, e.g. oil and water. An interface is formed between the liquids that can be deformed by applying an electric field. A small lens with a roughly one-to-one diameter to thickness ratio can be formed in this fashion. Large thin lenses are impractical with this approach due to fabrication constraints and gravity or acceleration effects.

A fifth technique utilized the ability to change the refractive index of some material by applying an electric field. This approach is exemplified in U.S. Pat. No. 7,215,480. Only small changes in refractive index can be obtained by this technique, which means only small changes in focus can be achieved.

SUMMARY OF THE INVENTION

The present invention provides a large diameter, thin, variable focus lens that would be practical in a variety of applications, such as eyeglasses. The present invention provides a surface that can be deformed to a desirable shape in a simple, controllable fashion. In particular, a surface shape with desirable optical properties is achievable. The surface has the ability to produce a reflective or refractive surface with a variable optical power.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figures 1A, 1B:
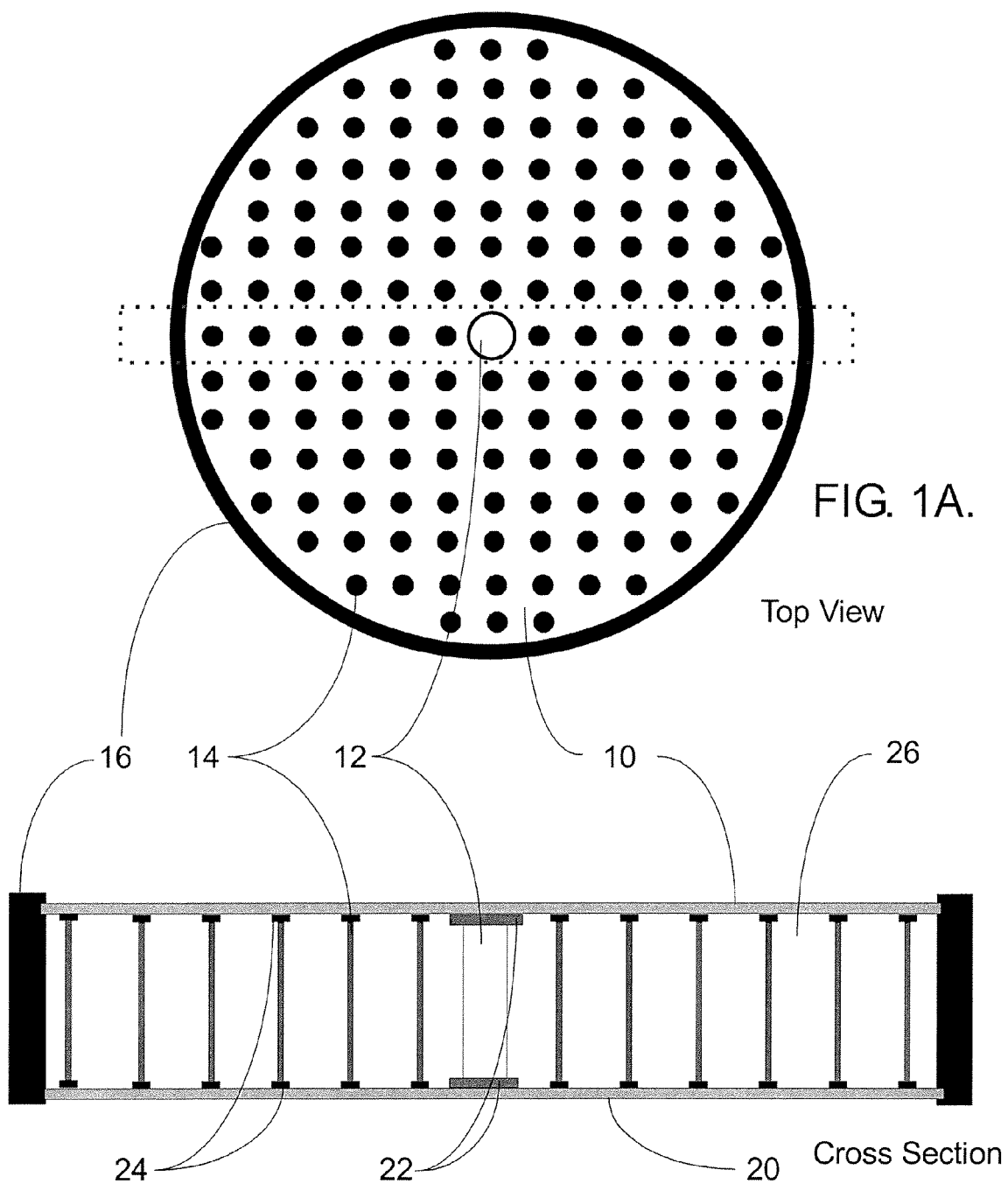
FIGS. 1A and B shows a top view and cross section view of the invention.

The current invention is shown as an optical device 8 in the top view and cross section shown in FIGS. 1A and B. FIGS. 1A and B shows a specific configuration that is of particular interest as an optical surface. Other configurations are clearly possible.

The device 8 includes a first material layer 10 and a second material layer 20. The first material layer 10 is flexible. The second material layer 20 may or may not be flexible depending on the specific design properties desired. An array of rods 14 connects between layers 10 and 20. The rods 14 may be round, hexagonal, square—the specific shape is not critical. For this configuration, the rods 14 should be mechanically stiff.

The connection between the rods 14 and the material layers 10 and 20 is via flex joints 24. The flex joints 24 allow the angle between the rods 14 and the material layers 10 and 20 to rotate in both non-axial directions with respect to the material layers 10 and 20. A ball and socket joint would be one implementation of the flex joint 24 with the ball being fabricated into the end of the rod 14 and the socket being fabricated into the material layers 10 and 20.

A central rod 12 connects to the material layers 10 and 20. A pair of rotational joints 22 connects the rod 12 to the layers 10 and 20. The rotation joints 22 allow the material layers 10 and 20 to rotate with respect to each other around the axis defined by the center axis of central rod 12. Unlike the flex joints 24, the rotational joints 22 do not allow flexure in the non-axial angles.

This arrangement of rods 14, flex joints 24, central rod 12, and rotational joints 22 allows the two material layers 10 and 20 to rotate with respect to each other, but not translate.

Figures 2A, 2B:
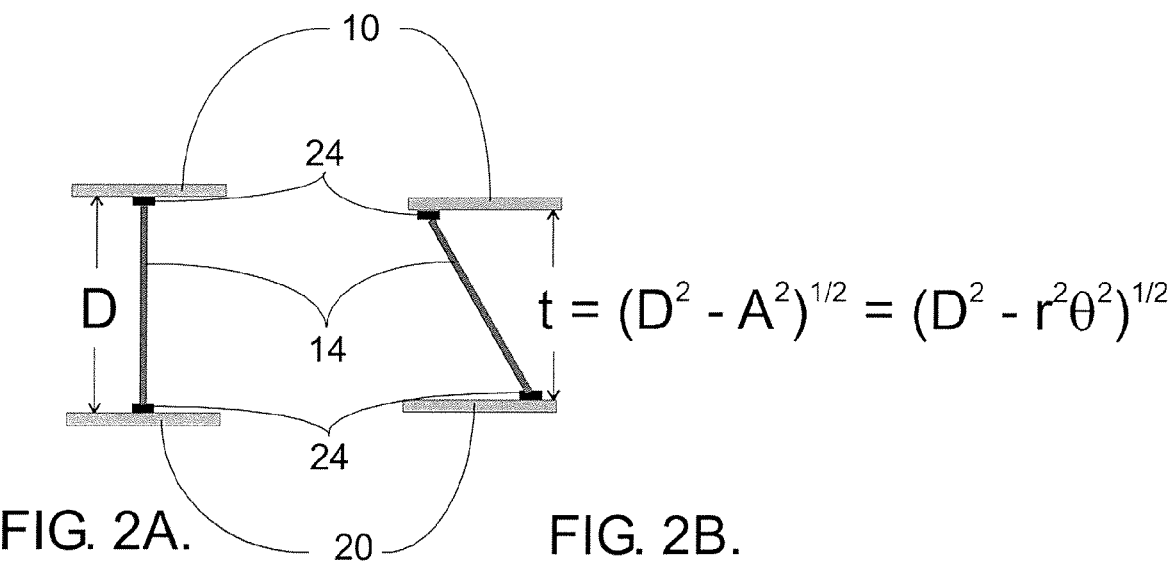
FIGS. 2A and B show the geometry and method by which the surface is controllably deformed.

When the flexible material layer 10 is rotated about the axis of the central rod 12, the effect for an individual rod 14 is shown in FIGS. 2A and B. As rotation occurs, the position of the flex joints 24 connected to each of the rods 14 is translated or shifted with respect to the initial alignment (initial vertically aligned). For a given shift (A) the spacing (t) between the two material layers 10 and 20 must decrease by an amount given by $$t = \sqrt{D^2 - A^2} \qquad (1)$$

where D is the length of the rod 14.

Figure 3:
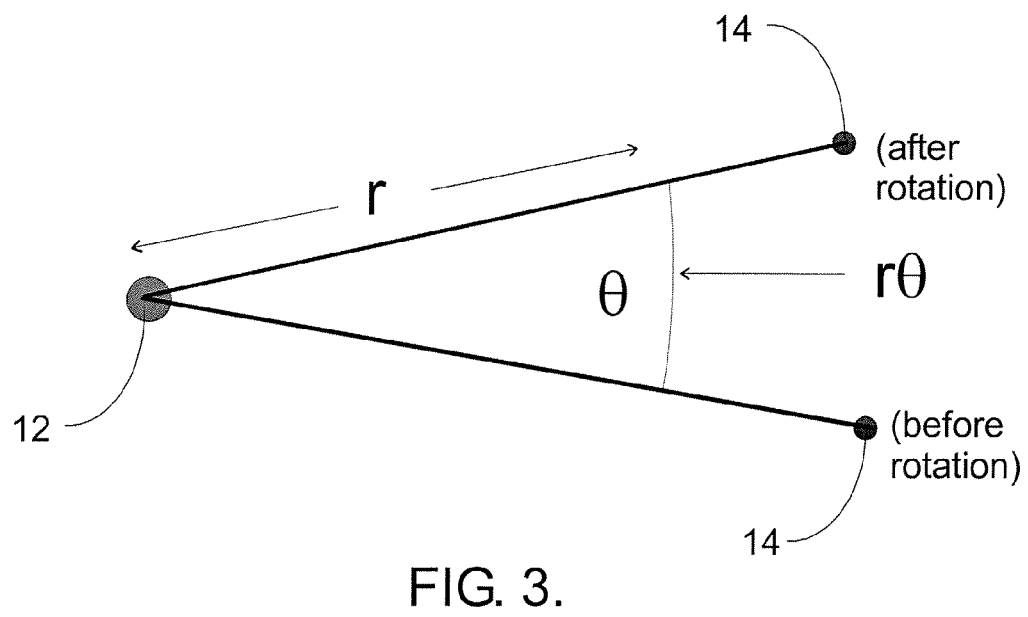
FIG. 3 illustrates a geometric relationship between components.

FIG. 3 shows how the displacement (A) of an individual rod 14 is further connected to the rotation angle θ and the radial distance r between the central rod 12 and the individual rod 14. The result is a quadratic relationship in the spacing between the two material lasers 10 and 20 and the radial distance from the rotation axis.

$$t=\sqrt{D^2-r^2\theta^2} \qquad (2)$$

Figure 4A:
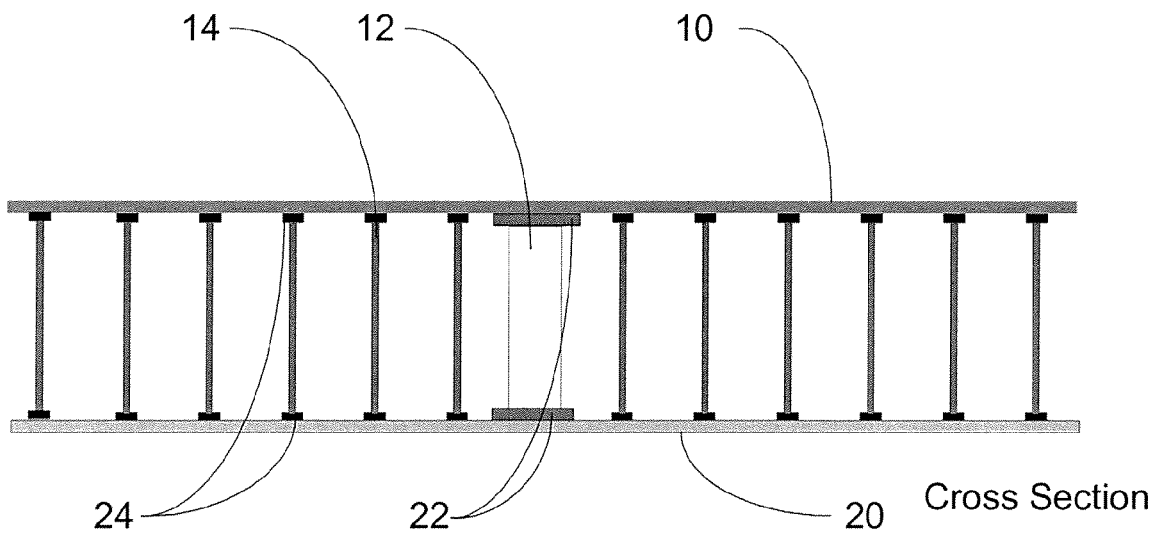
FIGS. 4A-C show an example surface deformation.
Figure 4B:
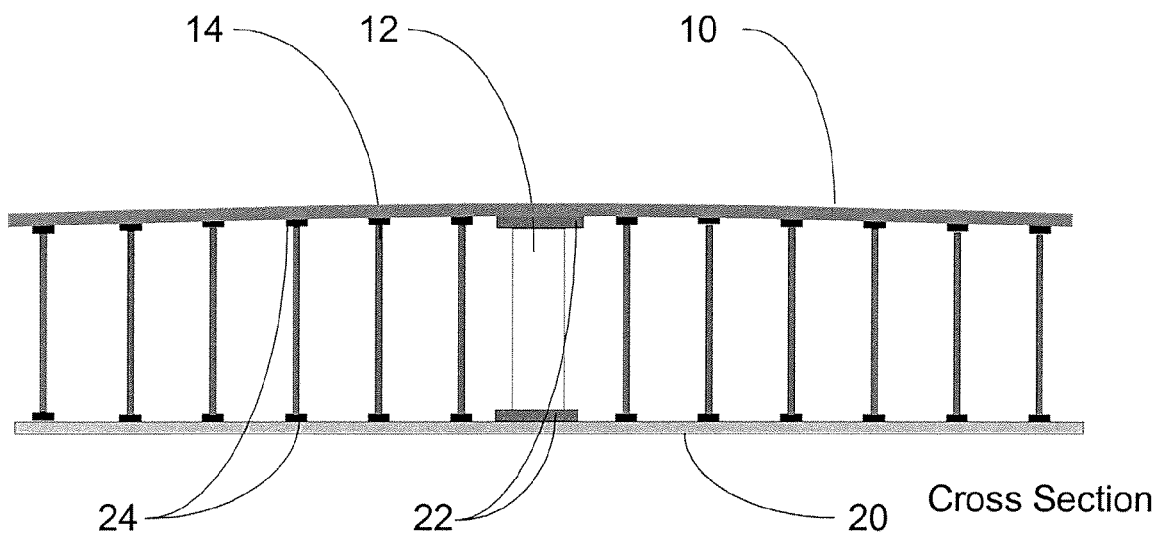
Figure 4C:
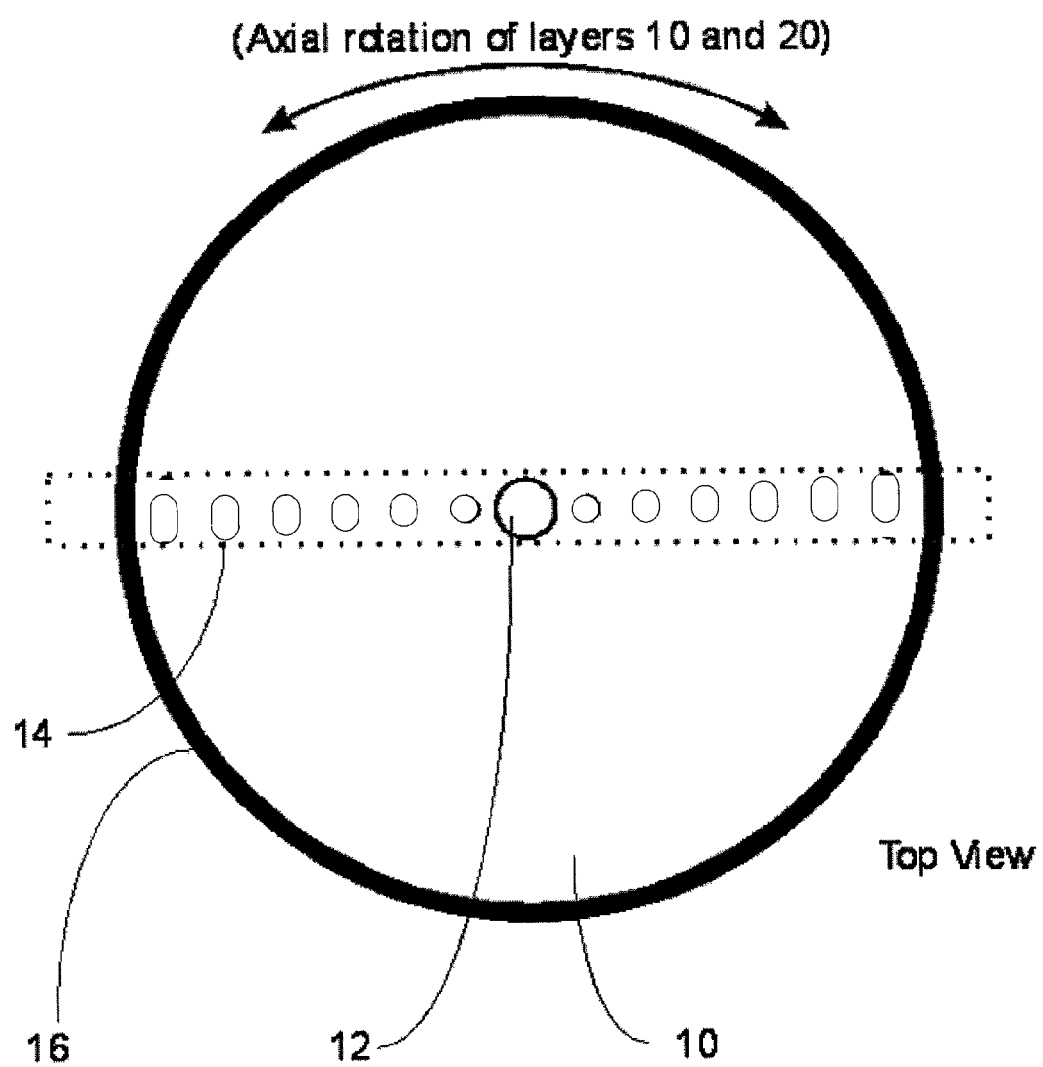

With a stiff second material layer 20, the first material layer 10 takes on a parabolic shape. This example is shown in FIGS. 4A, B and C with FIG. 4A showing a cross section before rotation and FIG. 4B showing the same cross section after rotation. Note that the tilting of the rods 14 is in the plane perpendicular to the cross section, so cannot be seen in this view. FIG. 4C is supplied as a top view to clarify the varying tilt of the rods 14 with radius. If both material layers 10 and 20 are flexible, the spacing between the layers 10 and 20 will be parabolic with the relative curvature of each layer 10 and 20 being determined by the relative stiffness of the two layers. This curvature effect is illustrated in FIG. 4.

A parabolic surface is of particular interest in optics for imaging purposes. As demonstrated above, the imaging power or focal length of the surface is controlled very simply via the rotation angle, θ. A reflective surface is obtained by coating the first material layer 10 with a suitable metal or dielectric reflector.

A refractive element can be obtained by fabricating all of the components of a transparent material and then filling the empty space between the layers 10 and 20 with a liquid or gel (Fluid 26) with index of refraction that matches the other components. The matching index of refractions will cause all of the mechanical (solid) components to optically 'disappear'. A thin, variable focus lens is thereby obtained. FIGS. 1A and B shows the use of a seal 16 is attached around the edge of material layers 10 and 20 to contain the fluid 26 within the assembly. For example, the seal 16 could be a rubber gasket The above example is illustrative of a basic mechanical configuration which can take on a multitude of variations. For example:

Clearly, transparent materials such as plastic with a liquid or gel of matching refractive index must be utilized when making a lens. For a mirror, other material such as metals or ceramics could be utilized.

The length of the rods 14 does not have to be equal. A 'pre-biased' shape can be formed into the two material layers 10 and 20 by using rods 14 of varying length, e.g. the shape can be initially concave with all rods 14 vertically aligned and become flat when rotated.

The pattern of rods 14 need not be a grid or even regular.

The rods 14 and flex joints 24 need not be individual components, but could be a structured 'compound' (monolithic) material that has similar mechanical sheer properties. In this case the material layers 10 and 20 may become an integral part of the structured compound.

The rods 14 are designed to bend if they are directly connected to the surfaces 10 and/or 20 (no flex joints 24).

A stiff outer collar used to control the position of the rotation axis.

Lateral shifts between the two material layers 10 and 20 can be used to affect the average spacing between the surfaces. A lateral shift will not affect the surface shape.

The central aspect of the current invention is the use of and array of rods 14 with flex joints 24 (or flexible rods) connecting two material layers 10 and 20, the layers 10 and 20 being stiff along their surface plane and flexible in their transverse axis such that a relative motion of the two layers can be used to produce a relative shape change. Of specific interest is a rotational motion used to produce a parabolic surface of variable curvature.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A deformable surface device comprising:
   an upper flexible material layer;
   a lower material layer;
   an array of connecting rods connecting the upper and lower material layers, said rods causing the spacing between the upper and lower material layers to change when one of the upper or lower layers is rotated; and
   means for rotating the upper and lower material layers about a center axis.

2. The device of claim 1, further comprising a reflective coating on the upper material layer thereby producing a variable focus mirror.

3. The device of claim 1, wherein the layers, rods, and rotation means are fabricated from at least one transparent material.

4. The device of claim 3, further comprising at least one of a liquid or gel located between the layers, the at least one of a liquid or gel having a refractive index that matches a refractive index of the at least one transparent material.

5. The device of claim 4, further comprising a sealing device for containing the at least one of a liquid or gel between the layers.

6. The device of claim 1, wherein lower material layer is formed of a rigid material.

7. The device of claim 1, wherein lower material layer is formed of a flexible material.

8. The device of claim 1, further comprising flexible joints located between the rods and the layers.

9. The device of claim 8, wherein the flexible joints include ball and socket joints.

10. The device of claim 1, wherein the rods vary in length.

11. The device of claim 1, wherein the means to allow rotation comprises a post connected between the centers of the upper and lower material layers.

* * * * *